March 21, 1933.   E. L. JOHNSON   1,902,367
SEAT
Filed March 11, 1930
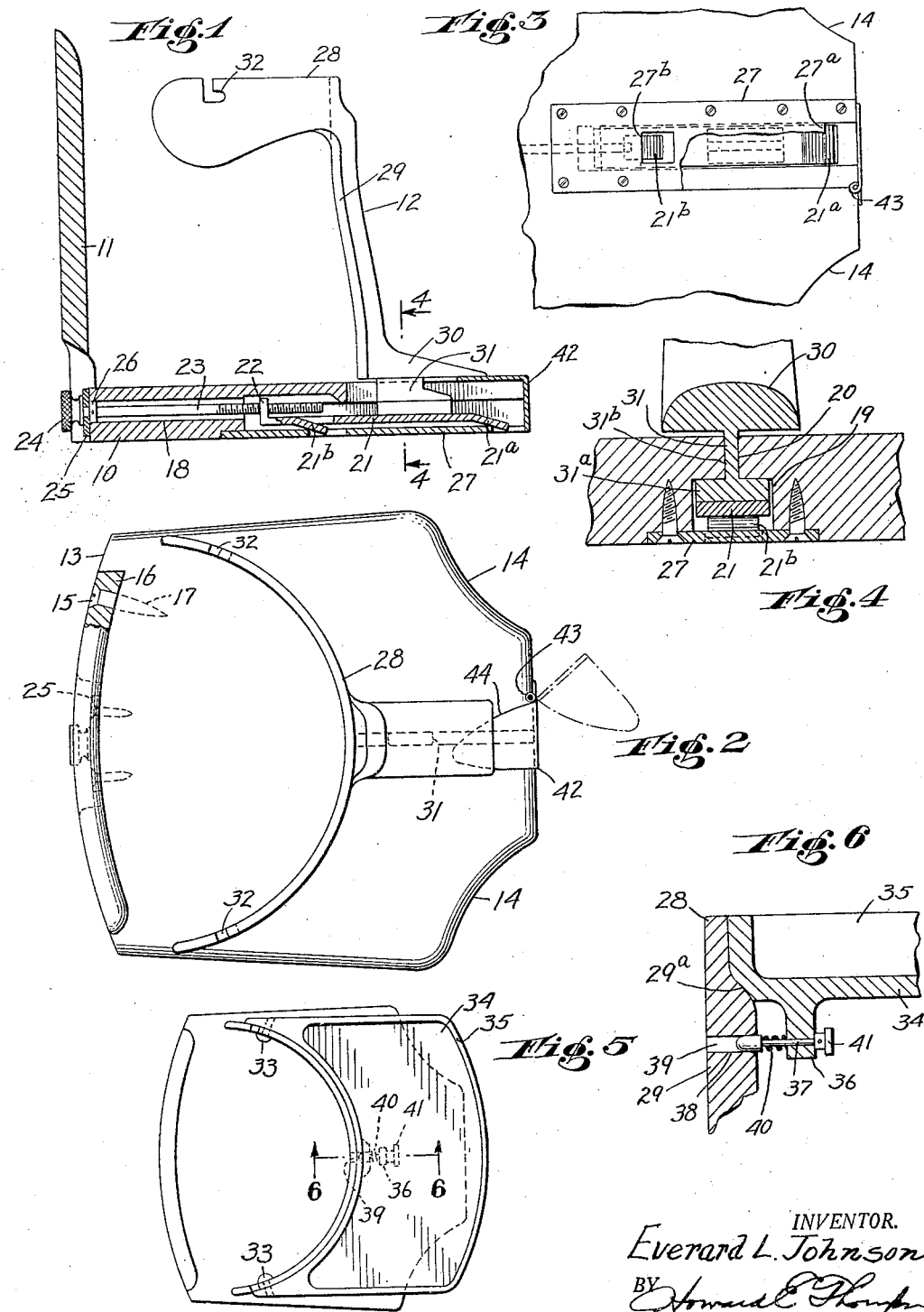
INVENTOR.
Everard L. Johnson
BY Howard E. Thompson
ATTORNEY Patented Mar. 21, 1933

1,902,367

UNITED STATES PATENT OFFICE

EVERARD L. JOHNSON, OF PATCHOGUE, NEW YORK

SEAT

Application filed March 11, 1930. Serial No. 434,869.

This invention relates to seats and particularly to devices of this class designed for use in supporting infants and small children so as to retain them from displacement from the seat, and while the invention is adapted for many uses, one of the distinctive uses thereof is for the purpose of supporting infants and children in proper position in the operation of taking photographs and especially in professional photography; and the object of the invention is to provide a seat of the class specified involving a seat member proper, a backrest and a front brace and supporting member adjustable with respect to the back member and including a body encircling portion; a further object being to provide means for quickly detaching said brace member from the seat; a further object being to provide a tray which may be used in conjunction with said brace and supporting member and means for retaining the tray against displacement from said member; and with these and other objects in view, the invention consists in a device of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a transverse, sectional view of a seat made according to my invention.

Fig. 2 is a plan and sectional view of the structure shown in Fig. 1.

Fig. 3 is a bottom plan view of a part of the seat proper with part of the construction broken away.

Fig. 4 is a section on the line 4—4 of Fig. 1.

Fig. 5 is a view similar to Fig. 2 on a reduced scale and showing a tray which I employ mounted in position; and, Fig. 6 is a partial section on the line 6—6 of Fig. 5 on an enlarged scale.

As shown in the accompanying drawing, my improved seat consists of a seat member proper 10, a backrest 11 and a front brace and support 12. The seat 10 has a curved rear edge 13 and the front edge of the seat is cut out at the corners as seen at 14 and said edge as well as the side edges of the seat are rounds so as to comfortably support the legs of the occupant of the chair. The rear edge 13 is also provided with dovetailed recesses 15 to receive downwardly directed dovetailed members 16 on the backrest which are secured in position by screws 17, it being understood that the backrest is arc-shaped in form to conform with the curvature of the rear edge of the seat 13 and also to fit comfortably around the back of the occupant of the chair.

Arranged centrally and longitudinally through the seat member 10 is a bore 18 which opens outwardly through the rear edge 13 of said seat member and the forward end of which opens into a comparatively large rectangular aperture 19 opening through the lower face of the seat and also communicating with a comparatively narrow aperture 20 which opens through the upper face of the seat. The apertures 19 and 20 also open outwardly through the front edge of the seat. Arranged in the elongated and rectangular aperture 19 is a lock bar 21 the transverse dimensions of which are slightly less than the corresponding dimensions of the aperture 19 to permit free movement of said bar longitudinally with respect to said aperture and the rear end of the bar has an upwardly directed flange 22 having a screw threaded aperture in connection with which the threaded portion of an adjustment screw 23 operates. The screw 23 is arranged in the bore 18 of the seat and has a milled head 24 at its outer end, the screw 23 being held against longitudinal movement by a plate 25 attached to the rear edge 13 of the seat member and by the head 24 and a collar 26 disposed at opposite sides of said plate. The rotation of the screw serves to feed the bar 21 longitudinally of the aperture 19. The forward end of the bar has a downwardly bent cam portion 21a and the rear end of said bar has a tongue 21b stamped therefrom which is also bent downwardly to form a cam member; and the cams 21a and 21b operate in connection with a plate 27 attached to the lower face of the seat member 10 which forms a closure for the aperture 19 and permits the vertical movement of the bar 21 to lock the brace and supporting member 12 in different positions of adjustment.

The member 12 has at its upper end a semicircular or arc-shaped portion 28 which is adapted to encircle the body of an occupant of the chair. Centrally of said arc-shaped portion is a downwardly directed supporting member 29 which is curved outwardly and then inwardly adjacent the lower end thereof in order to properly fit in the crotch of an infant or child arranged on the seat. At the lower end of the member 29 is a forwardly extending foot 30, the lower face of which is provided with a lug 31 which is T-shaped in cross sectional form, the crosshead 31a of said lug fitting in the aperture 19 whereas the connecting fin 31b is arranged in the aperture 20 of the seat member as clearly seen in Fig. 4 of the drawing. The crosshead 31a is engaged by the lock bar 21 and forced upwardly in the operation of securing and retaining the member 12 in different positions of adjustment forwardly and backwardly with respect to the backrest 11.

The lug 31 of the member 12 is coupled with the seat member 10 by passing the same into the apertures 19 and 20 through the forward edge of the seat. This operation is accomplished when the lock bar 21 is in inoperative position; and when the member 12 is in properly adjusted position, the screw 23 is operated to raise the bar 21 and thus secure the member 12 against movement, the two cams 21a and 21b producing the desired result.

It will be apparent that the cam 21a engages a cut out portion 27a at the front of the plate 27 whereas the cam 21b engages one wall of an aperture 27b formed in said plate as clearly seen in Fig. 3 of the drawing. The ends or side wings of the arc-shaped top member 28 are provided with apertures or notches 32 adapted to receive coupling pins 33 at the inner ends of the side portions of a tray 34 as seen in Fig. 5 of the drawing, the tray being shown detached in Figs. 1 and 2 to illustrate that the same may or may not be used, as desired. The tray is of a form more or less similar to that of devices employed in connection with children's high chairs, having a raised flange wall 35.

Arranged centrally of the back arc-shaped portion of the tray is a downwardly directed lug 36 in which is mounted a lock pin 37, the head 38 of which is adapted to enter an aperture 39 formed at the upper end of the part 29 of the member 12. A spring 40 is employed to normally retain the pin in extended position and the outer end of the pin in provided with a head 41 whereby the same may be removed from the aperture 39 to disengage the tray 34. It will also be noted that the tray rests upon the outwardly projecting rounded portion 29a of the part 29 in properly supporting the tray in position.

I also employ at the forward edge of the seat member a substantially L-shaped cover plate 42 which is pivoted as seen at 43. One end of the plate is adapted to rest upon the front edge of the seat to close the open end of the apertures 19 and 20 and the top wall of said plate is adapted to be arranged over the aperture 19. One edge of said top wall is rounded as seen at 44 to form a cam surface adapted to be engaged by the fin 31 to automatically move the plate 42 into open position as indicated in dot and dash lines in Fig. 2 of the drawing in the operation of removing the member 12 from the seat.

In the use of the device for photographic purposes, the seat and the several parts thereof including the outer surfaces of the plate 42 are painted or stained, preferably in a light color so that if any part of the seat is exposed, it will not show a shadow in the negative. It will also be noted at this time that the top wall of the plate 42 is adapted to rest beneath the foot 30 of the member 12 as seen in Fig. 1 of the drawing.

In the use of this device by professional photographers in taking pictures of infants or small children, the child is placed upon the seat member 10 with its back adjacent the back wall 11 after which the member 12 is placed in position and so adjusted as to arrange the arc-shaped portion 28 snugly about the body of the infant in a comfortable and yet freely supported position, so as to support the child in an erect manner, thus facilitating the taking of photographs. In this operation, it is preferred that the dress of the child be passed over and around the member 12 as well as upon the upper face of the seat member 10. As above stated, when the member 12 is in properly adjusted position, the same is locked in such position by means of the screw 23 and lock bar 21.

It will also be apparent that my invention may be applied to apparatus or devices of various kinds and classes, such for example as chairs, high chairs, swings and the like. The distinctive feature of the invention resides in the provision of means for so supporting a child in the device as to prevent accidental displacement of the child therefrom. It will also be understood that the structure of the several parts of the device may be varied to suit many uses thereof and various changes in and modifications of the construction herein shown and described may be made within the scope of the appended claims without departing from the spirit of my invention or sacrificing its advantages.

Having fully described my invention, what I claim as new and desire to secure by Letters Patent, is:—

1. The combination with a seat and an upright member on said seat movable forwardly and backwardly with respect thereto, of means for retaining said member in different positions of adjustment, the seat having an elongated channel and a part on said member operating in said channel, said retaining means comprising a cam plate arranged in said channel, a rod projecting at the rear end of the seat and in screw threaded engagement with said plate for moving said plate longitudinally in said channel into and out of engagement with the part on said member for retaining said member in different positions of adjustment.

2. The combination with a seat and an upright member on said seat movable forwardly and backwardly with respect thereto, of means for retaining said member in different positions of adjustment, the seat having an elongated channel and a part on said member operating in said channel, said retaining means comprising a cam plate arranged in said channel, a rod projecting at the rear end of the seat and in screw threaded engagement with said plate for moving said plate longitudinally in said channel into and out of engagement with the part on said member for retaining said member in different positions of adjustment, and means for retaining said rod against longitudinal movement with respect to said seat.

3. The combination with a seat, of a front supporting member adapted to engage the front part of the body of a person arranged on said seat, said member having an anchor portion slidably engaging the seat whereby said member may be adjusted forwardly and backwardly with respect to the seat, a lock bar arranged and movable longitudinally of the seat and cooperating with said anchor portion for retaining said member in different positions of adjustment, a screw accessible at the rear of the seat for moving said bar longitudinally, and means on the bar and seat for moving the bar vertically into engagement with the anchor portion of said member in the longitudinal movement imparted to said bar to retain said member against movement in the different positions of adjustment thereof.

In testimony that I claim the foregoing as my invention I have signed my name this 7th day of March, 1930.

EVERARD L. JOHNSON.